Figure 1:
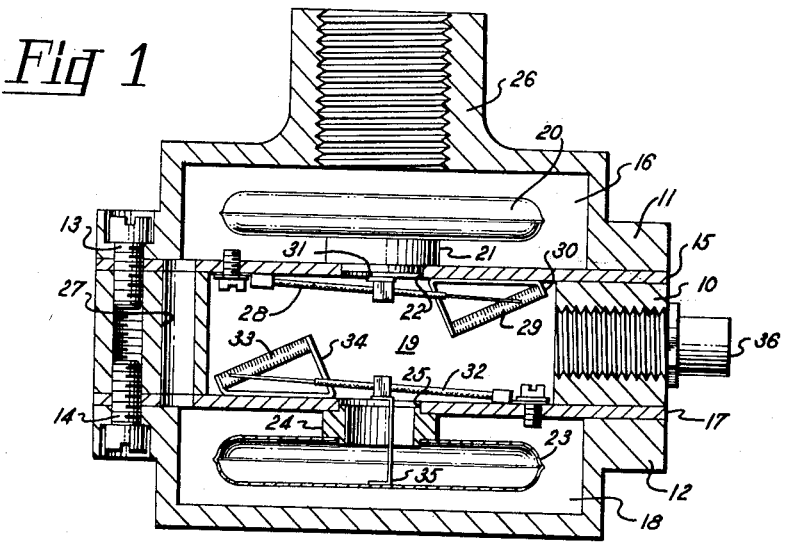

Oct. 20, 1959     G. R. CURTIS ET AL     2,909,062

TRANSDUCER

Filed Feb. 6, 1958

INVENTORS
GERALD R. CURTIS
JOSEPH P. GIBBS

BY Christie, Parker & Hale

ATTORNEYS

United States Patent Office 2,909,062
Patented Oct. 20, 1959

2,909,062

TRANSDUCER

Gerald R. Curtis, Duarte, and Joseph P. Gibbs, Pasadena, Calif., assignors to Consolidated Electrodynamics Corporation, Pasadena, Calif., a corporation of California Application February 6, 1958, Serial No. 713,717

8 Claims. (Cl. 73—398)

This invention relates to the measurement of forces by a transducer and particularly to a transducer in which improved accuracy is achieved by elimination of responses due to environments other than the force of interest.

The transducer according to the present invention is used for the accurate measurement of those forces which, by producing deflections in two force responsive means, are adaptable for effecting directionally opposite deflections of means maintained in operative relationship with suitable displacement sensing means. For such measurements, the transducer eliminates the spurious responses induced by forces effecting unidirectional deflections of the means maintained in operative relationship with the displacement sensing means.

The transducer of the invention is particularly useful for the measurement of pressure with a potentiometric system as the displacement sensing means. Therefore, while the invention is not so limited, a pressure transducer with a potentiometric system is described below to illustrate the concept according to the invention.

A potentiometric system for the measurement of pressure is particularly adapted for use where a high level electrical output, attainable without the use of amplification means, is required. The electrical output can be used to actuate telemetering transmitters or recording devices or it can be used in numerous control applications where a compensating response is required as a function of varying pressure. The characteristics of a potentiometric pressure system make it particularly suited for use in aircraft where control devices require high level electrical output consistent with minimum space availability for the pressure responsive components.

Essentially, in a conventional potentiometric system for the measurement of pressure, a brush or contact arm is actuated by a pressure responsive means in direct proportion to the deflections induced in the pressure responsive means by variations in pressure. The movement or travel of the brush along a resistance wire coil of a precision potentiometer varies the electrical output. While excellent performance is obtained from such a system under static conditions, a problem is introduced when the pressure transducer is used in a medium subjected to acceleration, vibration or shock. The effect of acceleration is to produce spurious movements of the contact arm so that the electrical output of the system is not directly proportional to the pressure input alone. While spurious responses due to acceleration are minimized in conventional pressure transducers by counterbalancing the contact arm and other components, a residual error remains.

The present invention provides a transducer in which effects of a force, such as acceleration, are under certain conditions nullified and, under other conditions, are reduced to a very low value. The invention is a transducer comprising a housing within which are mounted spaced apart first and second force responsive means. The force responsive means are deflectable by variations in the force of interest. Deflection transmitting means are joined to each of the force responsive means and are maintained in displaceable operative relation with displacement sensing means. The deflection transmitting means are arranged so that they are oppositely displaceable in direction responsive to deflections of the force responsive means produced by the force of interest. Electrical connections to the displacement sensing means are arranged so that opposite displacements of the deflection transmitting means produce an electrical output which is substantially equal to the electrical output which would be obtained responsive to an equal deflection of a single force responsive means. On the other hand, unidirectional displacements of the deflection transmitting means produce substantially no electrical output.

As applied to a pressure transducer utilizing a potentiometric system, one embodiment of the invention involves each pressure responsive means being joined to a contact arm acting as the deflection transmitting means, each contact arm being held in slidable engagement with separate variable resistance means. It can be seen that a pressure variation without accompanying acceleration or vibration produces a "normal" response in the pressure transducer of the invention. Because of the electrical arrangement, the electrical output obtained is the same as that which would be obtained if a single pressure responsive means actuated movement of a contact arm along a single variable resistance means. Where, however, the effect of a force is to produce a unidirectional movement of the two contact arms, each contact arm is moved along its respective variable resistance means for an equal distance. This effect would occur in acceleration or vibrational environments. The electrical connections to the displacement sensing means comprising the contact arms and the variable resistance means are arranged so that such movements produce no spurious electrical output when the contact arms are in certain positions along the variable resistance means at the time acceleration or vibration takes place. When the contact arms are displaced from these positions, a small electrical output, substantially less than would be produced in the absence of the correction achieved by the invention, is produced, as will be discussed below in greater detail.

Figure 2:
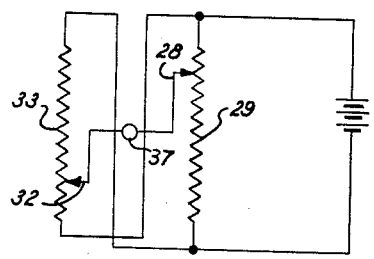

The apparatus of the invention and the method of operation will be more clearly understood from the following description taken in conjunction with the accompanying drawings in which:

Fig. 1 is a sectional elevation of a preferred embodiment of a pressure transducer according to the invention; and Fig. 2 is a schematic representation of the electrical circuit.

With reference to Fig. 1 a tubular central housing 10 is joined on its opposite ends to first cap section 11 and second cap section 12 respectively by means of cap screws 13 and 14. A solid plate 15 positioned between the central housing and the first cap section forms a first cap enclosure 16. A solid plate 17, positioned between the central housing and the second cap section, forms a second cap enclosure 18. Between the two solid plates a central enclosure 19 is formed within the central housing. Suitable gasket material is provided between the cap sections and the plates and between the central housing and the plates to make the enclosures fluid tight.

In the first cap enclosure, a first pressure sensitive capsule 20 (not sectioned) is centrally supported by a connector 21 (not sectioned). The pressure sensitive capsule is of a type well-known to the art and comprises a hollow element formed from a material deformable upon application of pressure. The connector is fitted into the interior of the capsule and, forming a fluid-tight seal with the plate 15, passes through a bore 22, centrally located in the solid plate, so as to join the interior of the capsule with the central enclosure.

In the second cap enclosure, a second pressure sensitive capsule 23, identical to the first capsule, is centrally supported by a connector 24. The connector is fitted into the interior of the capsule and, forming a fluid-tight seal with solid plate 17, passes through a bore 25 centrally located in solid plate 17. In this manner fluid communication is provided between the interiors of the two pressure sensitive capsules and the central enclosure.

A pressure inlet connection 26 is fitted through the wall of the first cap section so as to connect the first cap enclosure with a first external source of pressure. The first cap enclosure is connected by means of a port 27 to the second cap enclosure. Other ports, not shown in the drawing, are provided. The two cap enclosures are therefore joined so that changes in pressure of the external pressure source are simultaneously transmitted to the two enclosures. In this manner the pressure on the exterior of the two pressure capsules is at all times equal.

The central enclosure of the pressure transducer is joined by a second pressure inlet connection (not shown) to a second external source of pressure. When fitted in this manner, the pressure transducer acts to measure differential pressures. Pressure from the second external source is exerted upon the interior of the two pressure capsules and within the central enclosure. As previously described, pressure from the first external source is exerted in the first and second cap enclosures on the exterior of the pressure sensitive capsules.

It is readily apparent that with slight modification the pressure transducer described above may be fitted either to measure gauge pressures or absolute pressures. To measure gauge pressures, the central enclosure would be connected to the atmosphere. To measure absolute pressure, the central enclosure, as well as the first and second cap enclosures, would be evacuated.

A first contact arm 28 is pivotally joined at one end to solid plate 15 so as to be within the central enclosure. The other end of the contact arm is maintained in slidable relationship with a first resistance wire coil 29. The first resistance wire coil is mounted on a bracket 30 which is fixed to solid plate 15. The bracket angularly inclines the first resistance wire coil so that a small movement of the contact arm produces a magnified sweep along the resistance wire coil.

A first force rod 31 rigidly joined at one end to an interior wall of the first pressure sensitive capsule is joined at its other end to the first contact arm. In this manner deflections of the capsule responsive to variations in pressure are transmitted to the contact arm to produce a movement of the contact arm along the resistance wire coil.

A second contact arm 32 is pivotally joined at one end to solid plate 17 so as to be within the central enclosure. The second contact arm is maintained at its other end in slidable contact with a second resistance wire coil 33 supported by a bracket 34 rigidly joined to solid plate 17. This resistance wire coil is angularly inclined in the same manner as was described in connection with the first resistance wire coil. A second force rod 35 rigidly joined at one end to an interior wall of the second pressure sensitive capsule is joined at its other end to the second contact arm. Deflections of the pressure sensitive capsule are transmitted to the contact arm by the force rod.

The contact arms are mounted oppositely so that deflections of the two capsules responsive to a given variation in pressure produce an equal but opposite displacement of each contact arm along its respective resistance wire coil. In other words, with respect to a given pivot point, one contact arm moves in a counterclockwise direction while the other contact arm moves in a clockwise direction. It is apparent, however, that where a unidirectional force, such as acceleration, is applied, both contact arms move equally and in the same direction. As will become apparent from the description to be given in connection with Fig. 2, the resistance wire coils and the contact arms are electrically connected so that unidirectional movements of the contact arms are electrically nullified while equal but opposite movements of the contact arms produce an output substantially equivalent to the output produced by an equal deflection along a single resistance wire coil.

While not shown in detail, the resistance wire coils are electrically connected into a potentiometric system through a connector 36 fitted through the central housing into the central enclosure. Appropriate terminals to connect the respective ends of each resistance wire coil as well as each of the contact arms are provided.

With reference to Fig. 2, the manner in which the resistance wire coils of the potentiometric system are electrically connected is schematically shown. The resistance wire coils and the contact arms are identified by the same reference characters as used in connection with the description of Fig. 1. The two resistance wire coils 29 and 33 are electrically connected in parallel. As previously described, the contact arms 28 and 32 are mechanically arranged to move in opposite directions along their respective coils responsive to pressure variations. The coils, however, are electrically connected so that such movements are in the same direction electrically. Therefore, responsive to pressure variations, the electrical resistance of both potentiometric systems changes in the same manner. Accordingly, in the absence of an acceleration force the electrical output is the same as would be obtained if a single coil were used.

While the application of a unidirectional force, such as acceleration, mechanically produces a movement of both contact arms in the same direction, the movement of the two arms is opposite in direction electrically. Accordingly, an increase in electrical resistance along one coil due to displacement responsive to an acceleration force is balanced by a decrease in electrical resistance along the other coil. The effect is an electrical nullification of acceleration force without effect upon the measurement of the parameter of interest.

In the pressure transducer according to the invention, pressure variations produce an electrical response, equivalent to that which would be obtained responsive to deflection of a single pressure sensitive capsule from a potentiometric system utilizing a single resistance wire coil, in two instances. Such a response is obtained both where no acceleration force is present and where each contact arm is approximately at the mid-point of its respective coil when the acceleration force is applied. Where the contact arms are displaced from the mid-point and where an acceleration force is introduced, a spurious electrical signal is measured in addition to the electrical signal responsive to the pressure variation. The error introduced is considerably less than would be present in the absence of the correction produced by the pressure transducer according to the invention.

The above is illustrated by the data presented in the table below. The term "L" defines the position of the contact arms along the length of the resistance wire coils at the time the pressure variation to be measured occurs and is the decimal fraction of the linear length of a single coil. The term "ΔR," as a percentage of the linear length of a single coil, describes the linear distance separating the two contact arms following an equal but opposite movement of the arms along their respective coils responsive to a given pressure change. The term "Percent Error" describes the percentage deviation of the measured electrical response from that which the same pressure change would, in the absence of an acceleration force, produce in a potentiometric system employing a single resistance wire coil. The sign indicates whether the measured response is greater or less than the true value.

Table

| L | ΔR, Percent | Percent Error |
|---|---|---|
| .1 | 2 | +0.2 |
|  | 5 | +0.7 |
| .3 | 2 | +0.1 |
|  | 5 | +0.15 |
| .5 | 2 | 0 |
|  | 5 | 0 |
| .7 | 2 | −0.1 |
|  | 5 | −0.15 |
| .9 | 2 | −0.2 |
|  | 5 | −0.7 |

While the preferred embodiment of the pressure transducer has been described for the use of pressure-sensitive capsules, it is apparent that other elements deformable by the application of pressure may be utilized. For example, diaphragms may be used in place of the pressure capsules so as to cause movement of the contact arms in a similar manner. Other modifications in the means by which displacement of the contact arms is actuated may be employed without departing from the basic concept of this invention. Similarly, other suitable displacement sensing means, such as, for example, differential transformers, may be employed within the scope of the invention.

The pressure transducer of this invention offers the particular advantage that forces causing unidirectional movement of both contact arms do not significantly affect the electrical output produced responsive to pressure variations. This in itself makes it a device particularly suited for use in telemetering transmitters or recording devices requiring high sensitivity and the absence of spurious responses. In addition to this primary advantage, the pressure transducer of the invention also provides a compensating means for individual winding errors since the two potentiometers are electrically connected in parallel. Furthermore, a higher heat dissipation is achieved through the use of the double potentiometer system. These advantages make it a device well suited for numerous control applications.

We claim:

1. A pressure transducer comprising a housing, first and second pressure responsive means deflectable by pressure variations and spaced apart within the housing, first and second resistance means, first and second contact means slidably connected to the first and second resistance means respectively and arranged to move oppositely in direction responsive to pressure-induced deflections of the first and second pressure responsive means respectively, and electrical connecting means to the first and second contact means and the first and second resistance means, the electrical connecting means being arranged whereby equal movements of the first and second contact means in opposite directions produce an electrical output substantially equal in magnitude to the electrical output which would be produced by an equal movement of a single contact means along a single resistance means and equal unidirectional movements of the first and second contact means produce substantially no electrical output.

2. A pressure transducer comprising a housing internally separated by two spaced-apart plates to form first and second cap enclosures on opposite sides of a central enclosure, first and second hollow pressure-deformable capsules supported within the first and second cap enclosures respectively, the interiors of the capsules being connected in pressure communication with the central enclosure, means connecting the first and second cap enclosures in pressure communication, first and second resistance wire coils respectively fixed within the central enclosure to opposite plates, first and second contact arms within the central enclosure, each contact arm pivotally joined at one end to opposite plates, and maintained at the other end in slidable contact with the first and second resistance wire coils respectively, first and second force-transmitting rods, rigidly joined at one end to an interior wall of the first and second capsules respectively and joined at the other end to the first and second contact arms respectively whereby pressure responsive deflections of the capsules are transmitted to produce movements of the first and second contact arms, equal in magnitude but opposite in direction, along their respective resistance wire coils, and electrical connecting means to the resistance wire coils and the contact arms, the electrical connecting means being arranged whereby movements of the contact arms, equal in magnitude but directionally opposite along their respective resistance wire coils produce an electrical output equal to that produced by an equal movement of a single contact arm along a single resistance wire coil and movements of the contact arms, equal in magnitude and unidirectional, produce substantially no electrical output.

3. Apparatus in accordance with claim 2 wherein the central enclosure is connected to a first source of varying pressure and the first and second cap sections are connected to a second source of varying pressure.

4. Apparatus in accordance with claim 2 wherein the central enclosure is substantially evacuated of all gas and sealed and the first and second cap enclosures are connected to a source of varying pressure.

5. Apparatus in accordance with claim 2 wherein the central enclosure is connected to atmospheric pressure and the first and second cap enclosures are connected to a source of varying pressure.

6. A pressure transducer comprising a housing internally separated by two spaced-apart pressure-deformable diaphragms to form first and second cap enclosures on opposite sides of a central enclosure, means connecting the first and second cap enclosures in pressure communication, first and second resistance wire coils respectively fixed within the central enclosure to separate diaphragms, first and second contact arms within the central enclosure, each pivotally joined at one end to separate diaphragms, and maintained at the other end in slidable contact with the first and second resistance wire coils respectively, first and second force-transmitting rods within the central enclosure and joined at one end to the first and second diaphragms respectively and joined at the other end to the first and second contact arms respectively whereby pressure deflections of the diaphragms are transmitted to produce movements of the first and second contact arms, equal in magnitude but opposite in direction, along their respective resistance wire coils, and electrical connecting means to the resistance wire coils and the contact arms, the electrical connecting means being arranged whereby movements of the contact arms, equal in magnitude but directionally opposite along their respective resistance wire coils produce an electrical output equal to that produced by an equal movement of a single contact arm along a single resistance wire coil and movements of the contact arms, equal in magnitude and unidirectional, produce substantially no electrical output.

7. A pressure transducer comprising a housing, first and second pressure responsive means spaced apart within the housing, displacement sensing means, displacement transmitting means in displaceable operative relation with the displacement sensing means and arranged to move oppositely in direction responsive to pressure-induced displacements of each pressure responsive means, and an electrical measuring circuit, including the displacement sensing means, arranged whereby opposite movements of the displacement transmitting means produce an electrical output and unidirectional movements of the displacement transmitting means produce substantially no electrical output.

8. A pressure transducer comprising a housing internally separated by two spaced-apart plates to form first and second cap enclosures on opposite sides of a central enclosure, first and second pressure responsive means disposed within the first and second cap enclosures respectively, means connecting the first and second cap enclosures in pressure communication, displacement sensing means disposed in the central enclosure, displacement transmitting means in displaceable operative relation with the displacement sensing means and arranged to move oppositely in direction responsive to pressure-induced displacement of each pressure responsive means, and an electrical measuring circuit, including the displacement sensing means, arranged whereby opposite movements of the displacement transmitting means produce an electrical output and unidirectional movements of the displacement transmitting means produce substantially no electrical output.

References Cited in the file of this patent

UNITED STATES PATENTS

| | | |
|---|---|---|
| 2,542,717 | Smith | Feb. 20, 1951 |
| 2,593,169 | Moore | Apr. 15, 1952 |